R. RAFN.
CONVEYER.
APPLICATION FILED OCT. 15, 1918.

1,344,246.

Patented June 22, 1920.

Inventor
Robert Rafn by Byrnes Townsend & Brickenden
Attys.

UNITED STATES PATENT OFFICE.

ROBERT RAFN, OF MOSS, NORWAY.

CONVEYER.

1,344,246.   Specification of Letters Patent.   Patented June 22, 1920.

Application filed October 15, 1918. Serial No. 258,253.

*To all whom it may concern:*

Be it known that I, ROBERT RAFN, of Moss, in the Kingdom of Norway, have invented certain new and useful Improvements in Conveyers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to conveyers of the belt type and has for its object an arrangement of such conveyers which enables a series of machines of being supplied with materials from one point by the work of one single operator.

The conveyer constructed according to this invention works with a belt running from the point of supply to the places to be supplied. As compared with other conveyers of this type however the present arrangement is characterized by the fact that the supporting surface is smooth and of a hard material so that the conveyed objects when detained by an obstruction will be kept sliding upon the belt. According to the invention when a series of machines are to be fed an obstructing member is arranged in rear of the last one of the series of machines, so that the objects supplied are maintained at rest in front of all the machines when a sufficient number of the objects are supplied.

An embodiment of the invention is diagrammatically illustrated in the accompanying drawing in which—

Figure 1:
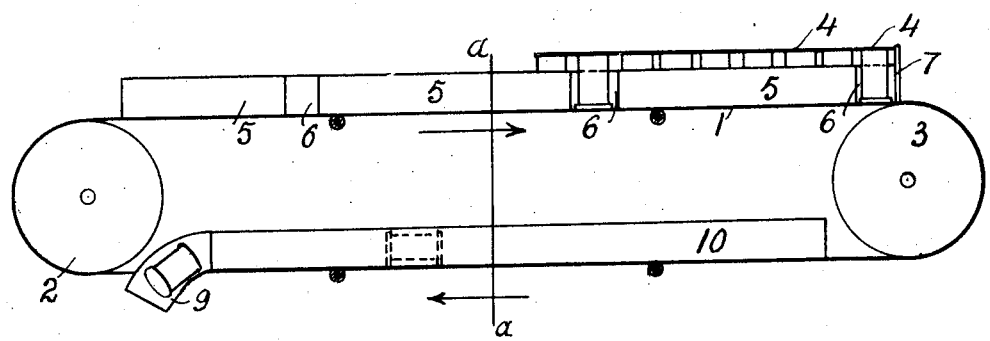
Figure 1 is a side view of the conveyer.
Figure 2:
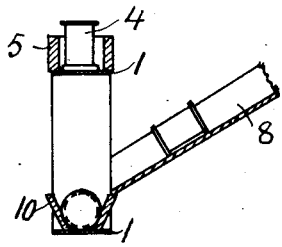
Fig. 2 is a sectional view on the line *a—b* (Fig. 1).

In the illustrated example 1 is a smooth belt of steel or other hard material running on large pulleys 2, 3. The pieces of material 4 which are to be conveyed are held on to the belt by means of a stationary trough or guide 5 of wood or iron plates with vertical sides. At each of the machines to be supplied with material the wall of the trough has an opening 6, somewhat larger than the sectional area of the pieces of material (in the present instance a tin) and extending down to the surface of the belt. At the last one of the series of machines is provided a cross wall 7 which stops the boxes and retains the whole row of them at rest in the trough, while the belt slides along under them. The task of the conveyer operator is now to keep the whole trough filled. When a piece is removed from the trough at one of the machines the whole series of boxes in rear of the removed one is carried forward and the operator has to place a further one on the belt. In the operation of a series of machines through each of which about one thousand pieces (such as cans or other objects) an hour have to pass, such a conveyer arrangement involves a very great simplification and saving. In many factories for instance of the can making industry each individual hand operated as well as semi-automatic can closing machine is supplied with box sashes or empty boxes usually arranged in piles in cases, and one single operator is able to attend only to a small number of machines, while with the aid of the conveyer above described he will be able to attend a plurality of machines. The arrangement further has the advantage of allowing the operator for instance of a can closing machine to take the can exactly from the same place each time viz. in the opening of the guide trough of the conveyer.

The conveyer may be arranged for double use, the returning part on the underside being then utilized to transfer the finished object from the machines to the place where it is to be further operated upon or stored. Thus in the illustrated example the closed cans fall down from the can closing machines into a chute 8 on to the belt 1 in the trough 10 and are removed in a lateral direction at the other end of the belt by means of an inclined way 9.

The conveyer is of special advantage in the canning industry and particularly in factories for condensed milk and other tinned milk.

I claim:

1. A system of conveying a series of objects simultaneously to a plurality of discharge stations, comprising an endless belt interconnecting the said discharge stations with a charging station, means disposed above and laterally of the belt for guiding the objects on the belt, an opening in the guiding means at each discharge station for permitting the removal of an object and an abutment at the remotest discharge station above the belt in the path of the objects conveyed thereby.

2. A system of conveying to and receiving from a plurality of stations objects, comprising an endless belt interconnecting the said stations with a charging station, means disposed above and laterally of the upper flight of the belt for guiding the objects on the belt, an opening in the guiding means at each station for permitting the removal of an object, an abutment at the remotest station above the belt and in the path of the objects conveyed thereby, means above and laterally of the lower flight of the belt for guiding objects thereon and means near the charging station for discharging the objects from the lower flight of the belt.

In testimony that I claim the foregoing as my invention, I have signed my name in presence of two subscribing witnesses.

ROBERT RAFN.

Witnesses:
 M. W. KAHN,
 C. NORMAN.